United States Patent [19]
Grasso

[11] Patent Number: 4,801,356
[45] Date of Patent: Jan. 31, 1989

[54] REMOVAL OF AMMONIA FROM FUEL CELL POWER PLANT WATER SYSTEM

[75] Inventor: Albert P. Grasso, Vernon, Conn.

[73] Assignee: International Fuel Cells Corporation, South Windsor, Conn.

[21] Appl. No.: 108,529

[22] Filed: Oct. 15, 1987

[51] Int. Cl.⁴ .......................... B01D 3/06; B01D 3/38
[52] U.S. Cl. .......................................... 203/11; 203/4; 203/12; 203/73; 203/78; 203/79; 203/80; 203/88; 203/DIG. 20; 202/173; 202/182; 202/202; 423/356
[58] Field of Search ................ 203/4, 12, 88, 73, 78, 203/79, 80, DIG. 9, DIG. 20, 40, 3, DIG. 18; 159/2.1, 47.1, 47.2; 423/356, DIG. 19; 55/36; 210/903; 202/173, 182, 202

[56] References Cited

U.S. PATENT DOCUMENTS

| | | | |
|---|---|---|---|
| 3,186,795 | 6/1965 | Fields et al. | 423/356 |
| 3,462,347 | 8/1969 | Chapman et al. | 203/79 |
| 3,754,376 | 8/1973 | Kent | 55/51 |
| 4,111,759 | 9/1978 | Didycz et al. | 203/10 |
| 4,140,586 | 2/1979 | Kwasnoski et al. | 423/356 |
| 4,246,417 | 1/1981 | Tsao | 203/10 |
| 4,260,462 | 4/1981 | Didycz et al. | 203/80 |
| 4,323,430 | 4/1982 | Glassman et al. | 203/79 |
| 4,342,735 | 8/1982 | Tsao | 423/356 |
| 4,345,975 | 8/1982 | Abe et al. | 203/37 |
| 4,352,680 | 10/1982 | Hackler | 55/48 |
| 4,396,463 | 8/1983 | Josis et al. | 203/10 |
| 4,547,293 | 10/1985 | King et al. | 210/638 |
| 4,594,131 | 6/1986 | Maier | 203/11 |

FOREIGN PATENT DOCUMENTS

| | | | |
|---|---|---|---|
| 76213 | 9/1870 | German Democratic Rep. | |
| 1083290 | 4/1986 | Japan | 203/10 |
| 7804668 | 10/1979 | Netherlands | 203/10 |
| 0753326 | 7/1956 | United Kingdom | 203/79 |

OTHER PUBLICATIONS

Hou, "Manufacture of Soda", 2nd ed., ACS, Reinhold Publishing Corporation, 1942, p. 234.

Primary Examiner—David L. Lacey
Assistant Examiner—N. Manoharan
Attorney, Agent, or Firm—William W. Jones

[57] ABSTRACT

Ammonia which is present in fuel cell power plant water in free form, in ionic form, and in forms combined with carbon dioxide, is removed from the power plant water by steam stripping. Water which has been used to cool the fuel reformer effluent, and thus has become contaminated with ammonia, is fed to a first steam stripper wherein a first portion of the ammonia contaminant is removed. The partially stripped water is then fed to a second steam stripper wherein further amounts of ammonia are removed from the water with steam. The ammonia laden steam from the two strippers is combined and vented through a single vent thus conserving the amount of water lost from the system.

7 Claims, 1 Drawing Sheet

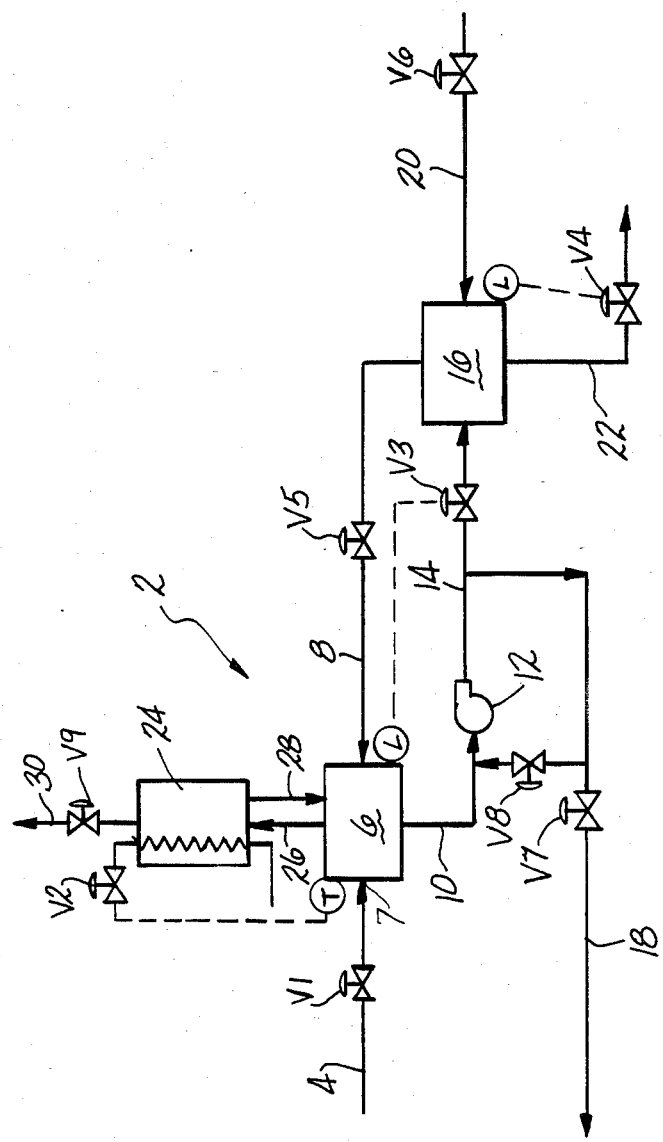

REMOVAL OF AMMONIA FROM FUEL CELL POWER PLANT WATER SYSTEM

TECHNICAL FIELD

This invention relates to a system for removing ammonia from a fuel cell power plant water supply, and more particularly, to such a system which uses steam to strip the ammonia from the water.

BACKGROUND ART

Fuel cell power plant systems which utilize water as a coolant will preferably be fitted with a closed water circulating and recirculating system which does not require substantial, if any, amounts of make up water. It is greatly preferred to replace any water which is used by the system with product water formed by the electrochemical reaction of the fuel cells. In fuel cell power plants which utilize a raw hydrocarbon fuel such as methane, naphtha or the like, which must be reformed to a hydrogen rich fuel gas in a catalytic reformer, varying amounts of ammonia will be formed in the reformer and thus will be present in the reformer effluent, i.e., in the hydrogen rich fuel gas. Depending on the amount of nitrogen present in the raw hydrocarbon gas being reformed, the amounts of ammonia present in the reformer effluent can be as high as about 500 ppm by volume. The ammonia levels in the fuel gas must be lowered to a level of not more than about 2 ppm by volume before the fuel gas is fed into the cells because the ammonia will poison the catalysts in the cells if present in higher concentrations. To remove the ammonia from the fuel gas, the reformer effluent is fed into a cooler housing through which it rises to an outlet at the top of the housing which leads to the power section. The effluent gases entering the bottom of the coolant housing are at a temperature of about 415° F. Water, at a temperature of about 130° F. is admitted to the top of the housing in a spray, so that the water is sprayed into, and falls through the rising reformer effluent gases. The temperature of the reformer effluent gases is thus lowered to about 140° F. as the gases leave the cooler, and the ammonia and other contaminant gases, such as carbon dioxide, are stripped out of the reformer effluent by the counter flowing water. The concentrations of ammonia in the fuel gas going to the power section from the cooler will be about 2 ppm by volume, or lower. The water which settles in the bottom of the cooler, which has entrained therein ammonia and other gaseous contaminants, is withdrawn from the cooler. The contaminated water will be at a temperature of about 255° F. and a pressure between 140 to 160 psia. This water can contain up to about 400 ppm by weight ammonia, in various forms, such as free ammonia, ammonium ions, and in various ammonium carbonate and bicarbonate compounds. This ammonia can be removed from the water with the normal ion exchange water purification system used in the power plant, however, this would require frequent regeneration of the purification system, which would also result in substantial amounts of water being removed from the power plant as waste water. As noted above, the power plant is designed to be a non-user of make up water, thus the use of the ion exchange beds to rid the water of these large amounts of ammonia is not acceptable.

DISCLOSURE OF THE INVENTION

This invention relates to a subsystem which is used in the power plant water circulation circuit to remove substantial amounts of the ammonia in water which has been used for treating the reformer effluent. The system of this invention utilizes steam produced by the power plant to strip the water of ammonia. The water from the fuel gas cooler is carried to a first steam stripper wherein it is stripped of a portion of its ammonia content. The partially stripped water is then carried to a second steam stripper where it is subjected to a second steam stripping operation which removes further ammonia from the water. After the second steam stripping operation, the twice stripped water is fed into the water storage tank in the power plant for further water purification with ion exchange beds, followed by recycling through the plant. In order to enhance the operation of the system, the steam from one steam stripper, after being used, is carried to the other steam stripper to augment the stripping capability of the latter. To conserve the amount of water lost from the power plant system, the ammonia-laden steam is only vented from the power plant at the augmented steam stripper. The steam vented from the plant is vented into a condenser which condenses water out of the steam. This condensed water returns to the steam stripper, and the ammonia-laden steam is vented from the condenser. This steam can effectively remove from the power plant up to about 86% of the ammonia found in the fuel gas coolant water. This rate of ammonia removal can be accomplished with an attendant loss of only about 5% of the product water, in the form of steam, from the power plant. Thus, no make up water from external sources will be needed. The specific amount of ammonia removed by the system of this invention can be varied by varying the flow rates of the water, and by varying the temperature of the fuel gas cooling water, or both. In addition to removing ammonia from the power plant water, the system of this invention will also remove hydrogen, carbon dioxide, carbon monoxide and argon from the power plant water. For example, more than 99% of the carbon dioxide in the power plant water will be vented from the system along with the ammonia.

It is therefore an object of this invention to provide a system for removing ammonia from water in a fuel cell power plant which does not require that externally sourced make up water be added to the power plant.

It is an additional object of this invention to provide a system of the character described wherein the total energy required for removing the ammonia from the water is derived from normal operation of the power plant.

It is a further object of this invention to provide a system of the character described which does not require the use of demineralizing beds to remove major amounts of ammonia, thereby extending the operating time of the power plant between regeneration of the demineralizing beds.

It is another object of this invention to provide a system of the character described wherein the ammonia is removed by steam stripping it from the water.

These and other objects and advantages of the system of this invention will become more readily apparent from the following detailed description of a preferred embodiment thereof when taken in conjunction with the accompanying drawing.

BRIEF DESCRIPTION OF THE DRAWING

The FIGURE is a schematic representation of the steam stripping subsystem encorporated in the water circulating system in a fuel cell power plant.

BEST MODE FOR CARRYING OUT THE INVENTION

The subsystem, denoted generally by the numeral 2, has an inlet line 4 which ducts water contaminated with ammonia from the reformer effluent fuel gas cooler (not shown) to the first steam stripper which preferably takes the form of a flash tank 6. The water in the line 4 is at a pressure in the range of about 140 to 160 psia and a temperature of about 255° F. The hot pressurized water in the line 4 enters the flash tank 6 through a restricted orifice 7 so that, once in the tank 6, the water will flash to produce steam through the pressure drop from the line 4 to the tank 6. The pressure in the tank 6 will be about 20 psia and the temperature of the water about 228° F. In addition to the steam created by the flashing, additional steam is fed into the tank 6 through line 8, as will be explained hereinafter. The flashing of the steam in the tank 6 will remove about 54% of the ammonia in the water, and the partially decontaminated water is taken from the tank 6 into a drain line 10 to a pump 12 which pumps the water through a first line 14 to a second steam stripper 16, and also through a second branch line 18 which goes back to the reformer effluent fuel gas cooler. Thus, varying proportion of the water from the flash tank 6 may be returned to the fuel gas cooler, and the remainder undergoes further ammonia removal in the steam stripper 16. Steam at a temperature of about 375° F. and a pressure of about 188 psia from the power section of the power plant is fed through line 20 into the steam stripper 16 where the steam passes through the water from the line 14. The water and steam in the steam stripper 16 will be at a temperature of about 248° F. and a pressure of about 29 psia. The steam from the line 20 is operable to remove about 70% of the remaining ammonia from the water in the steam stripper 16.

The further decontaminated water is removed from the steam stripper 16 through a drain line 22 and taken therein to the water storage tank in the power plant for further water purification before being returned to the water system. The steam from the steam stripper 16, now including ammonia gases, is drawn into the line 8 and taken thence to the flash tank 6. The steam in the flash tank 6, partly flash steam and partly steam from the steam stripper 16, rises into a condenser 24 through line 26. Water is condensed out of the steam-and-ammonia mixture in the condenser 24 to return back to the flash tank 6 via line 28. The remaining steam and ammonia mixture is vented out of the condenser 24 through line 30. The temperature in the condenser 24 is about 228° F.

The system 2 also includes various flow control valves $V_1$ through $V_9$ which control flow rates, flow paths and other parameters in the system 2. The valve $V_1$ controls the flow rate of reformer effluent into the flash tank 6 and is itself controlled by the power plant microprocessor control. The valve $V_2$ is controlled by the temperature in the flash tank 6 and is operable to vary the coolant flow rate on the condenser 24 thereby controlling the temperature in the latter. The valves $V_3$ and $V_4$ control the flow rates of water through the lines 14 and 22, respectively, and are controlled by the levels of water in the flash tank and steam stripper 6 and 16 respectively. Valves $V_5$ $V_6$ control the flow rate of steam through the lines 8 and 20 respectively; and are themselves controlled by the power plant microprocessor control. Valves $V_7$ and $V_8$ control the amount of water recirculated back to the reformer effluent cooler and are controlled by the plant microprocessor control. Finally, valve $V_9$ controls the rate at which steam and contaminant gases are vented from the condenser 24 and is itself controlled by the plant microprocessor.

Using the system of this invention at predetermined flow rates, about 85% of the ammonia contaminant can be removed from the water by the time the water reaches the line 22. The removed ammonia is vented from the subsystem along with only about 5% of the product water in the water circuit. This low level of water loss is the result of combining the steam from the stripper 16 and the flash tank 6 and passing the combined steam-ammonia mixture into the condenser 24 where some of the water is recovered from the mixture and returned to the flash tank 6. The single vent is an important feature which helps achieve the low rate of water loss.

An example of the operation of the aforesaid system is as follows. When a raw hydrocarbon fuel is used which has a nitrogen content of 7%, and which is reformed under kinetic conditions, i.e., with the gas constantly moving through the reformer, and not dwelling therein, sufficient nitrogen will be converted to ammonia to produce a cooling stripper water in the line 4 which will have an ammonia content of 75 ppm by weight when the power plant is running at full power. The water in the line 10 after leaving the flash tank 6 will have an ammonia content of about 46 ppm by weight, and the water in the line 22 will have an ammonia content of 14 ppm by weight. These ammonia levels will be achieved by operating the system at the temperature and pressure levels disclosed above. It has been determined that the system of this invention can adequately decontaminate water when the power plant is using a raw hydrocarbon fuel with a nitrogen content of up to 12% when the plant is run at any power level between stand by and full.

Since many changes and variations of the disclosed embodiment of the invention may be made without departing from the invention concept, it is not intended to limit the invention otherwise than as required by the appended claims.

I claim:

1. In a closed water cycle fuel cell power plant, a method for removing ammonia, gaseous ammonium compounds such as ammonium carbonates and bicarbonates, and carbon dioxide contaminants from contaminated water in the power plant, said method consisting essentially of the steps of:
    (a) providing a stream of the contaminated water at superatmospheric pressure and elevated temperature having an ammonia content of less than about 500 ppm by weight;
    (b) performing a first steam stripping operation on said stream of contaminated water by contacting the latter with steam to strip a first portion of the ammonia content from the water;
    (c) performing a second steam stripping operation on the contaminated water after said first steam stripping operation is completed to strip a second portion of the ammonia content from the water, said two steam stripping operations being operable to remove at least about 85% of the ammonia and about 99% of the carbon dioxide from the contaminated water stream;

(d) combining contaminated steam exhausted from said second steam stripping operation with steam used in said first steam stripping operation during performance of the latter so that said first stripping operation is performed with a combined supply of steam and feeding combined contaminated steam exhausted from said first steam stripping operation into a condenser to condense water out of the combined contaminated steam; and (e) venting contaminated steam from the condenser at controlled rates so that the vented steam has a water content which is less than the available amount of water produced by the electromechanical reaction in the full cell power plant.

2. The method of claim 1 wherein the steam for one of said steam stripping operations is provided by dropping the pressure of said stream of contaminated water so as to flash steam therefrom.

3. The method of claim 2 wherein the steam for the other of said steam stripping operations is supplied from a water coolant system in the power plant which controls the temperature of the fuel cells in the power plant.

4. In a closed water cycle fuel cell power plant, a method for removing ammonia, gaseous ammonium compounds such as ammonium carbonates and bicarbonates, and carbon dioxide contaminants from contaminated water in the power plant, said method consisting essentially of the steps of:

(a) providing a stream of contaminated water having an ammonium content of less than about 500 ppm by weight at a pressure in the range of about 140 or about 160 psia, and a temperature of about 255° F.;

(b) lowering the pressure of the contaminated water stream to about 20 psia, and the temperature thereof to about 228° F. to flash steam from said water stream to perform a first steam stripping operation on said water stream;

(c) providing a supply of steam at a temperature of about 375° F. and a pressure of about 188 psia from a power section of the power plant;

(d) mixing steam from said supply thereof with said water stream after completion of said first stripping operation, to perform a second steam stripping operation on said water stream, said two steam stripping operations being operable to remove at least about 85% of the ammonia and about 99% of the carbon dioxide from the water stream;

(e) mixing contaminated steam exhaust from said second steam stripping operation with the flash steam in said first steam stripping operation during performance of said first steam stripping operation to form a supply of combined contaminated steam;

(f) feeding the combined contaminated steam to a condenser to condense water out of the combined contaminated steam; and (g) venting contaminated steam from the condenser at a controlled rate so that the vented steam has a water content which is less than the available amount of water added to the water cycle by the electromechanical reaction in the fuel cells.

5. A system for removing ammonia, gaseous ammonium compounds such as ammonium carbonates and bicarbonates, and carbon dioxide contaminates from contaminated water in a fuel cell power plant having a closed water cycle, said system consisting essentially of:

(a) a first steam stripping vessel;

(b) means for delivering a supply of high pressure, high temperature contaminated water having a ammonia content of less than about 500 ppm by weight, to said first steam stripping vessel;

(c) first means for providing a supply of steam to said first steam stripping vessel for admixture therein with the contaminated water to remove a portion of the contaminants from the contaminated water;

(d) a second steam stripping vessel;

(e) means for delivering partially decontaminated water from said first steam stripping vessel to said second steam stripping vessel;

(f) second means for delivering steam to said second steam stripping vessel for admixture therein with the partially decontaminated water to remove a further portion of the contaminants from the water, said first and second steam stripping vessels being operable to remove a total of at least about 85% of the ammonia from the water, and about 99% of the carbon dioxide from the water;

(g) means for directing steam from said second steam stripping vessel to said first steam stripping vessel for combining contaminant-laden steam from said first and second steam stripping vessels;

(h) a condenser;

(i) means for feeding the combined contaminant-laden steam to said condenser to condense water out of said contaminant-laden steam; and (j) valve means for venting dewatered contaminant-laden steam from said condenser, the vented steam, by reason of said valve means having a water content which is less than the amount of water produced by the fuel cells in the power plant whereby externally sourced makeup water is not needed to operate the system.

6. The system of claim 5 wherein said first means for delivering a supply of steam comprises a restricted orifice through which the high pressure, high temperature contaminated water flows into said first steam stripping vessel whereby the pressure of the water will drop to flash steam from the water.

7. The system of claim 6 wherein said second means for delivering steam comprises means for delivering steam from a coolant section of the power plant to said second steam stripping vessel.

* * * * *